United States Patent
Iwagaki et al.

(10) Patent No.: US 10,781,883 B2
(45) Date of Patent: Sep. 22, 2020

(54) CENTRIFUGAL PENDULUM DAMPER

(71) Applicant: TOYOTA JIDOSHA KABUSHIKI KAISHA, Toyota-shi, Aichi-ken (JP)

(72) Inventors: Tomo Iwagaki, Mishima (JP); Hiroyuki Amano, Susono (JP); Masayuki Ishibashi, Numazu (JP); Ryoo Yongjoo, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 72 days.

(21) Appl. No.: 16/056,965

(22) Filed: Aug. 7, 2018

(65) Prior Publication Data
US 2019/0048972 A1 Feb. 14, 2019

(30) Foreign Application Priority Data

Aug. 9, 2017 (JP) ................... 2017-153909

(51) Int. Cl.
*F16F 15/14* (2006.01)
*F16F 15/31* (2006.01)

(52) U.S. Cl.
CPC .......... *F16F 15/1457* (2013.01); *F16F 15/31* (2013.01); *F16F 2222/08* (2013.01); *F16F 2232/02* (2013.01)

(58) Field of Classification Search
CPC ............... F16F 15/1457; F16F 2222/08; F16F 2232/02; F16F 15/31
See application file for complete search history.

(56) References Cited

U.S. PATENT DOCUMENTS

| 5,976,020 A * | 11/1999 | Lohaus ............... F16F 15/1205 192/30 V |
| 10,132,384 B2 * | 11/2018 | Takikawa .............. F16F 15/145 |
| 10,508,708 B1 * | 12/2019 | Tomiyama ............ F16F 15/145 |

(Continued)

FOREIGN PATENT DOCUMENTS

| JP | H01312246 A | 12/1989 |
| JP | 2000018329 A | 1/2000 |

(Continued)

OTHER PUBLICATIONS

Derwent Abstract of JP 2017-31995 A, Amano et al., Feb. 9, 2017. (Year: 2017).*

(Continued)

*Primary Examiner* — Vinh Luong
(74) *Attorney, Agent, or Firm* — Hunton Andrews Kurth LLP (57) ABSTRACT

A centrifugal pendulum damper for effectively suppressing torsional vibrations resulting from torque pulse. The centrifugal pendulum damper comprises: a rotary member rotated by a torque; an inertial member that rotates relatively to the rotary member; a chamber formed on the inertial member; and a rolling member held partially in the chamber while being allowed to oscillate therein, and held partially by the rotary member while being allowed to move radially. A raceway surface on which the rolling member rolls is formed in the chamber in such a manner that a curvature radius of an orbit of a gravity center of the rolling member oscillating along the raceway surface is increased with an increase in an oscillation angle of the rolling member.

11 Claims, 10 Drawing Sheets

(56) References Cited

U.S. PATENT DOCUMENTS

| | | | |
|---|---|---|---|
| 10,514,080 B2* | 12/2019 | Horita | F16F 15/145 |
| 2013/0014609 A1* | 1/2013 | Tsukano | F16F 15/1457 74/574.2 |
| 2014/0174869 A1* | 6/2014 | Takikawa | F16F 15/145 188/378 |
| 2016/0169320 A1* | 6/2016 | Suzuki | F16F 15/145 188/378 |
| 2017/0234401 A1 | 8/2017 | Horita et al. | |

FOREIGN PATENT DOCUMENTS

| | | | |
|---|---|---|---|
| JP | 2017-31995 | * | 2/2017 |
| JP | 2017040318 A | | 2/2017 |
| JP | 2017145857 A | | 8/2017 |

OTHER PUBLICATIONS

Define line—Google Search, Jan. 8, 2020 (Year: 2020).*
Define radius curvature, Google Search, Jan. 9, 2020 (Year: 2020).*

* cited by examiner

CENTRIFUGAL PENDULUM DAMPER

The present disclosure claims the benefit of Japanese Patent Application No. 2017-153909 filed on Aug. 9, 2017 with the Japanese Patent Office, the disclosure of which is incorporated herein by reference in its entirety.

BACKGROUND

Field of the Disclosure

The present disclosure relates to the art of a centrifugal pendulum damper for suppressing vibrations resulting from torque pulse.

Discussion of the Related Art

JP-A-2000-18329 describes a flywheel having a centrifugal pendulum damper. In the flywheel described in JP-A-2000-18329, chambers individually having a curved guide surface are formed in the main body, and a damper mass (rolling member) is held in each of the chambers. Each of the damper mass is centrifugally pushed onto the guide surface and oscillated by torque pulse along the guide surface thereby absorbing torsional vibrations resulting from pulsation of an engine torque.

Figure 1:
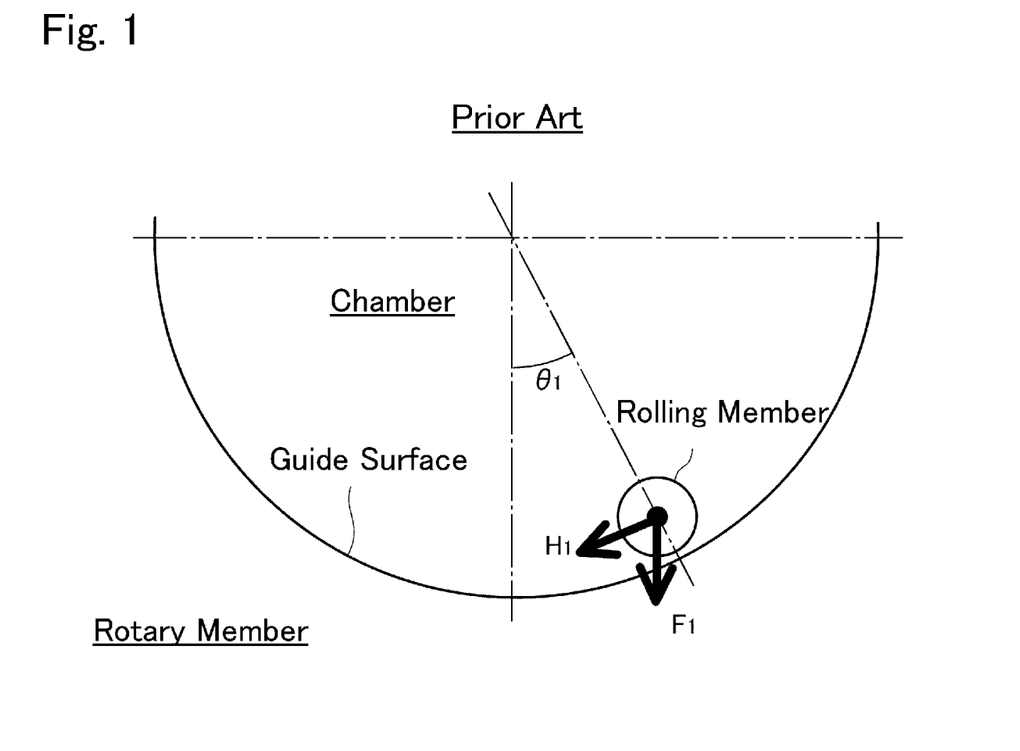
FIG. 1 is a schematic illustration showing a restoring force of a rolling member of a conventional centrifugal pendulum damper in which the rolling member serves as an inertial mass.

In the centrifugal pendulum damper described in Patent JP-A-2000-18329, the guide surface is formed such that a distance from the center of curvature radius of an outermost portion of the guide surface to an orbit of a weight center of the rolling member is increased toward circumferentially outwardly from the outermost portion. Specifically, as shown in FIGS. 1 and 2 of JP-A-2000-18329, each of the chambers is shaped into a curved oval shape that is longer in the circumferential direction, and the guide surface is formed along a radially outer edge of the chamber. In the centrifugal pendulum damper taught by JP-A-2000-18329, therefore, a restoring force to return the rolling member to the outermost portion of the guide surface is increased toward circumferentially outwardly from the outermost portion. The restoring force may be indicated as a component of the centrifugal force applied to the rolling member. Specifically, given that the centrifugal force acting on the rolling member is $F_1$ and an oscillation angle of the rolling member is $\theta_1$ (absolute value) as shown in FIG. 1, the restoring force $H_1$ (absolute value) can be expressed as $$H_1 = F_1 \cdot \sin \theta_1 \ (0 < \theta_1 < \pi/2).$$

Although not especially shown in FIG. 1, in the centrifugal pendulum damper taught by JP-A-2000-18329, each of the chambers is sufficiently isolated away from the rotational center of the flywheel in the radial direction. Therefore, the centrifugal force $F_1$ may be approximated to a downward force in the vertical direction in FIG. 1. The centrifugal force $F_1$ becomes constant at a predetermined rotational speed, and the restoring force $H_1$ changes substantially linearly with respect to the oscillation angle $\theta_1$. That is, the restoring force $H_1$ increases with an increase in the oscillation angle $\theta_1$ to return the rolling member to the outermost portion of the guide surface. For this reason, number of oscillation of the rolling member per revolution may be maintained to number of torque pulse to stably damp the torsional vibrations resulting from torque pulse.

As described, the centrifugal pendulum damper taught by JP-A-2000-18329 is formed integrally with the flywheel. For example, in a case of arranging the centrifugal pendulum damper taught by JP-A-2000-18329 in an output side of an engine, a torque of the engine is applied directly to the flywheel, and the vibrations resulting from pulsation of the engine torque is damped by an inertial moment of the rolling member serving as an inertial mass. However, the vibration damping performance of the pendulum damper of this kind may be restricted by a mass of the rolling member. JP-A-2017-40318 also describes a torque pulse suppressing device as a centrifugal pendulum damper comprising an inertial ring allowed to rotate relatively to a rotary member, and in the torque pulse suppressing device, torque of a prime mover is applied to the inertial mass through a centrifugal member. In the centrifugal pendulum damper of this kind, principle of the restoring force to return the inertial mass to the outermost point is different from that in the centrifugal pendulum damper taught by JP-A-2000-18329. Therefore, if the oval chamber is described in JP-A-2000-18329 is applied to the centrifugal pendulum damper taught by JP-A-2000-18329, the restoring force may not be changed in a desirable manner and an oscillation width of the inertial ring may not be restricted within a desirable range. In this case, therefore, number of oscillation of the inertial ring per revolution may be differentiated from number of torque pulse thereby reducing vibration damping performance. Thus, it is required to improve the vibration damping performance of the centrifugal pendulum damper in which the torque of the prime mover is applied to the inertial mass via the rolling member.

SUMMARY

Aspects of preferred embodiments of the present application have been conceived noting the foregoing technical problems, and it is therefore an object of the present disclosure is to improve vibration damping performance of a centrifugal pendulum damper in which a torque of a prime mover is applied to an inertial mass through a rotary member.

The embodiment of the present disclosure relates to a centrifugal pendulum damper comprising: a rotary member to which a torque of a predetermined prime mover is applied; an inertial member that is allowed to rotate relatively to the rotary member; a chamber that is formed on the inertial member; and a rolling member that is held partially in the chamber while being allowed to roll along a raceway surface formed on an inner circumferential face of the chamber, and that is held partially by the rotary member while being allowed to move in a radial direction of the rotary member. The torque applied to the rotary member is transmitted to the inertial member through the rolling member to suppress torsional vibrations of the rotary member. The raceway surface is formed such that a center of curvature of the raceway surface is situated radially outside of a rotational center of the inertial member. Specifically, the raceway surface is contoured such that a curvature radius of an orbit of a gravity center of the rolling member oscillating along the raceway surface becomes shortest when the gravity center is situated on a first line passing through the rotational center in a direction perpendicular to a tangent line to the orbit, and such that the curvature radius becomes longer with an increase in an acute angle between the first line and a second line intersecting with the first line.

In a non-limiting embodiment, the raceway surface may be contoured such that the orbit takes the form of a part of an ellipse whose major axis extends in the radial direction of the inertial member.

In a non-limiting embodiment, the ellipse may be expressed as $$x^2/a^2 + y^2/b^2 = 1 \ (0 < a < b)$$

given that a length of the major axis of the ellipse is 2b and a length of a minor axis of the ellipse is 2a. In addition, the length of the major axis and the length of the minor axis are set such that a ratio a/b between the length of the major axis and the length of the minor axis satisfies the following inequality:

$$0.6 < a < 0.8.$$

In a non-limiting embodiment, the raceway surface may be contoured such that the orbit takes the form of a part of a predetermined a parabola or a hyperbolic curve.

In a non-limiting embodiment, the centrifugal pendulum damper may further comprise a guide groove that is formed on the rotary member to restrict a movement of the rolling member in a rotational direction of the rotary member while allowing the rolling member to move in the radial direction of the rotary member. A contact point between the rolling member and the guide groove may move in the radial direction of the rotary member, and the rolling member may be brought into contact to the guide groove and the raceway surface, when the rotary member and the inertial member rotate relatively to each other.

In the centrifugal pendulum damper according to the embodiment of the present disclosure, when the rotary member is rotated by the torque of the prime mover, the rolling member is centrifugally pushed onto the raceway surface while being oscillated along the raceway surface by torque pulse. According to the embodiment of the present disclosure, the raceway surface is contoured in such a manner that the curvature radius of the orbit of the gravity center of the rolling member is increased with an increase in an oscillation angle of the rolling member. For example, the raceway surface may be contoured such that the orbit of the gravity center of the rolling member takes the form of a part of a parabola, a hyperbolic curve, or an ellipse. According to the embodiment, therefore, an inertial force for suppressing the torque pulse will not be changed in a non-linear fashion or logarithmically with a change in the oscillation angle. Specifically, when the oscillation angle of the rolling member is increased by the torque pulse, the inertial force for suppressing the torque pulse is increased linearly with an increase in the torque pulse. For this reason, the vibration suppressing performance of the centrifugal pendulum damper can be maintained in accordance with a magnitude of the torque pulse. Consequently, the natural frequency of the vibration system can be maintained substantially constant irrespective of the oscillation angle of the rolling member. As a result, the centrifugal pendulum damper is allowed to stably suppress the torsional vibrations of predetermined order.

A torque transmission point between the rolling member and the inertial member is displaced in the radial direction periodically and repeatedly by a relative rotation between the rotary member and the inertial member caused by the torque pulse. Consequently, the rolling member is oscillated in an opposite phase thereby absorbing the torque pulse transmitted from the rotary member to the inertial member though the rolling member. According to the embodiment, therefore, torsional vibrations resulting from torque pulse can be suppressed and absorbed effectively. In addition, according to the embodiment, the inertial member is arranged concentrically with the rotary member. According to the embodiment, therefore, size and dimension of the inertial member may be altered arbitrarily according to need. For this reason, a large inertial force can be ensured even in a small space to suppress the vibrations effectively.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Preferred embodiments of the present disclosure will now be explained with reference to the accompanying drawings.

The present disclosure relates to a centrifugal pendulum damper comprising: a rotary member to which a torque is applied from a prime mover such as an engine; an inertial member that is allowed to rotate relatively to the rotary member; a chamber formed in the inertial member; and a rolling member that is held in the chamber while being allowed to roll along a raceway surface formed on an inner circumferential edge of the chamber. Specifically, the rolling member is held partially in the chamber, and a remaining portion of the rolling member is held by the rotary member while being allowed to move in a radial direction. A torque of the rotary member is transmitted to the inertial member through the rolling member. Consequently, the inertial member is rotated relatively to the rotary member thereby suppressing torsional vibrations on the rotary member. The applicant of the present application has disclosed this kind of the centrifugal pendulum damper in JP-A-2017-145857.

Figure 2:
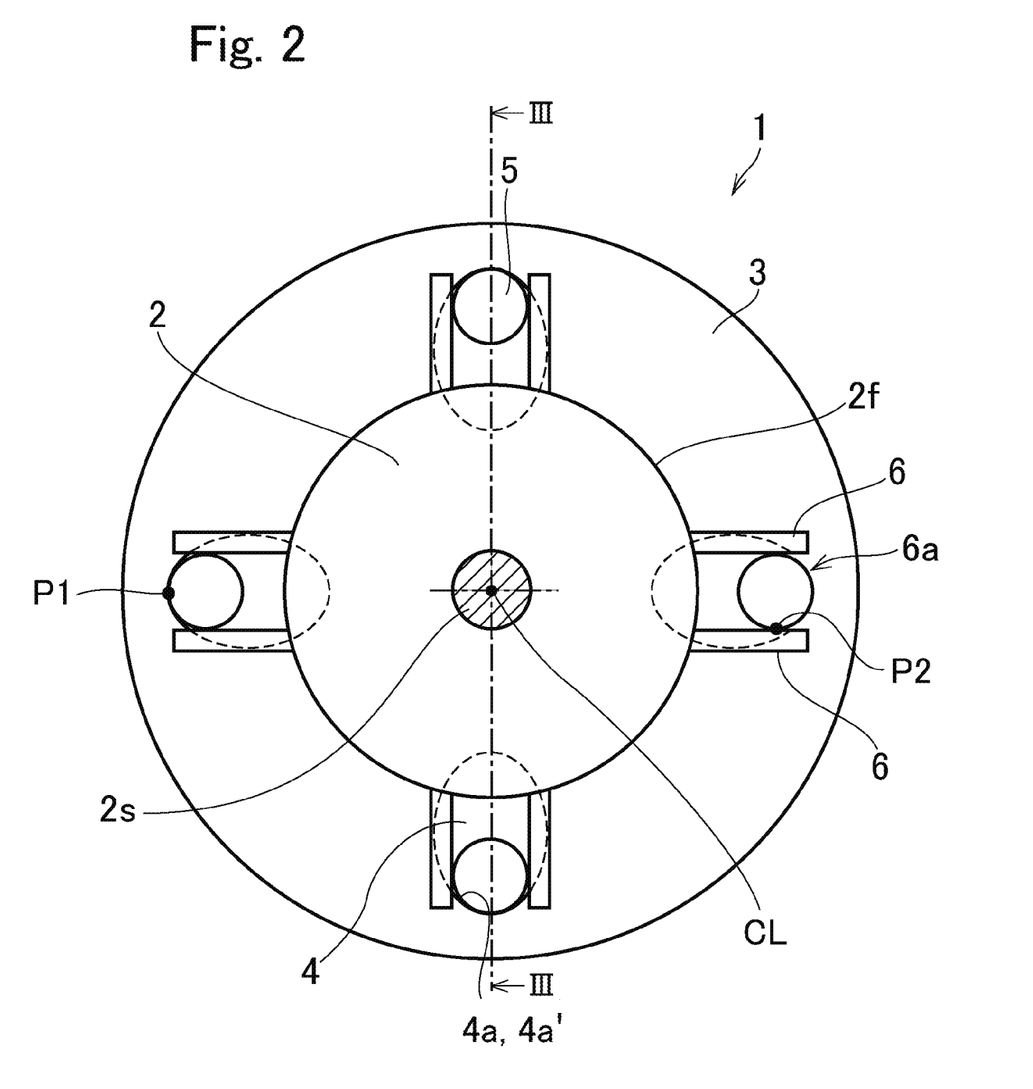
FIG. 2 is a schematic illustration showing a centrifugal pendulum damper according to the embodiment of the present disclosure.
Figure 3:
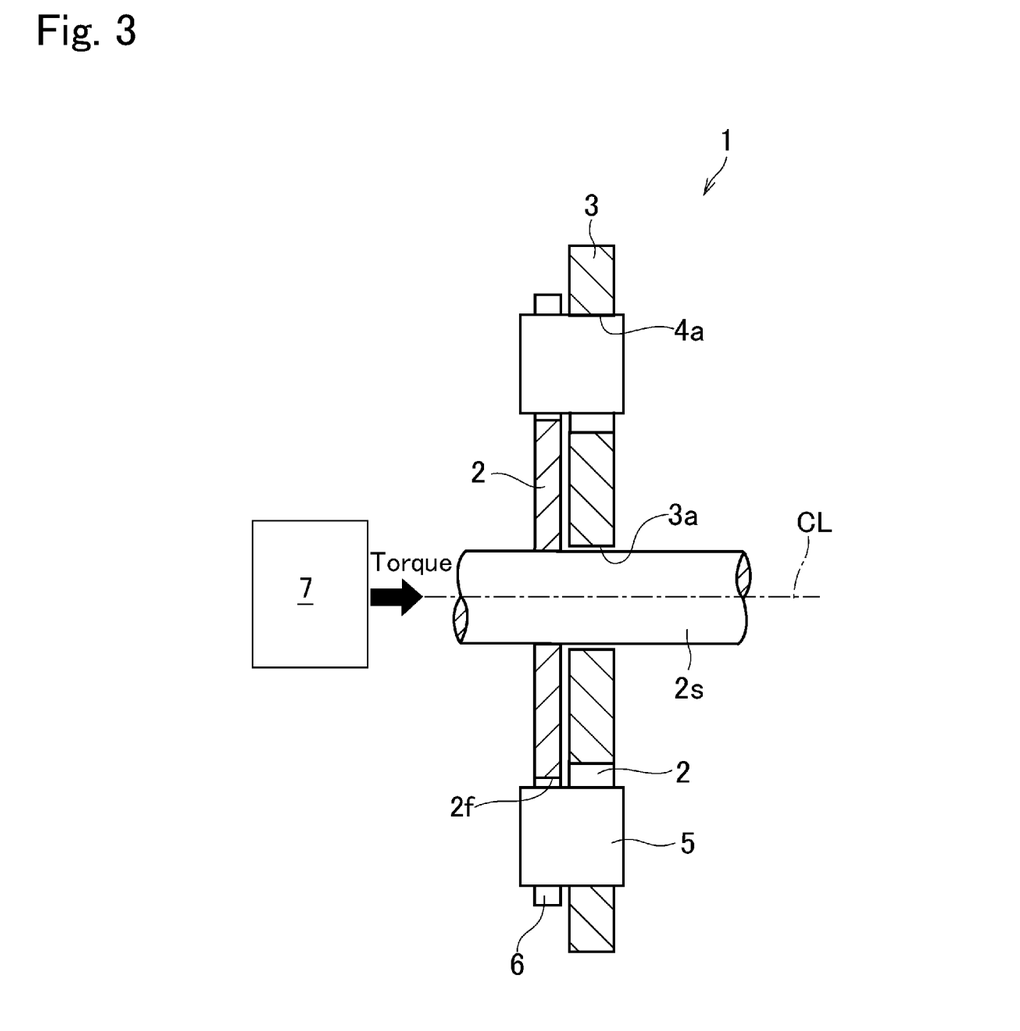
FIG. 3 is a cross-sectional view showing a cross-section of the centrifugal pendulum damper taken along a line in FIG. 2.

Referring now to FIGS. 2 and 3, there is shown a structure of the centrifugal pendulum damper according to the embodiment of the preset disclosure. A fundamental structure and an operating principle of the centrifugal pendulum damper (as will be simply called the "damper" hereinafter) 1 shown therein are similar to those of the centrifugal pendulum damper described in JP-A-2017-145857. The damper 1 comprises: a rotary member 2, an inertial member 3, a chamber 4, a rolling member 5, and a guide groove 6a.

As illustrated in FIG. 2, the rotary member 2 is a circular plate member, and a penetrates through a center of the rotary member 2. A torque of a prime mover 7 such as an engine and a motor is applied to the shaft 2s, and the rotary member 2 is rotated by the torque applied to the shaft 2s.

The inertial member 3 is an annular plate member arranged coaxially with the rotary member 2. A through hole 3a is formed in a center of the inertial member 3, and the shaft 2s of the rotary member 2 is inserted loosely into the through hole 3a. Specifically, a predetermined clearance is maintained between the through hole 3a and the shaft 2s, and the shaft 2s is inserted into the through hole 3a while being allowed to rotate relatively to the inertial member 3. That is, the inertial member 3 is supported by the shaft 2s of the rotary member 2 while being allowed to rotate relatively to the rotary member 2. As described later, in the damper 1, the torque is transmitted between the rotary member 2 and the inertial member 3 through the rolling member 5. Since the inertial member 3 has a predetermined mass, pulsation of the torque applied to the rotary member 2 is absorbed by an inertial moment of the inertial member 3 derived from a relative rotation of the inertial member 3 with respect to the rotary member 2. Consequently, torsional vibrations on the shaft 2s of the rotary member 2 may be reduced.

A plurality of the chambers 4 are formed in an inner circumferential portion of the inertial member 3 at regular intervals, and the rolling member 5 is held in each of an inner circumferential face 4a' of the chambers 4. Specifically, at least two pairs of chambers 4 are formed in the inertial member 3 symmetrically with respect to a rotational center CL, and according to the embodiments, two pairs of chambers 4 are formed in the inertial member 3.

A radially outer portion of an inner circumferential edge of the chamber 4 serves as a raceway surface 4a. A curvature radius of the raceway surface 4a is shorter than a radius of the inertial member 3, and when the damper 1 is rotated, the rolling member 5 is centrifugally pushed onto the raceway surface 4a while oscillating along the raceway surface 4a. A torque is transmitted between the rolling member 5 and the raceway surface 4a at a contact point P1 between the rolling member 5 and the raceway surface 4a. The contact point P1 moves along the raceway surface 4a in accordance with an oscillation of the rolling member 5 resulting from pulsation of the engine toque. That is, the contact point P1 moves in the radial direction in accordance with the oscillation of the rolling member 5.

Figure 4:
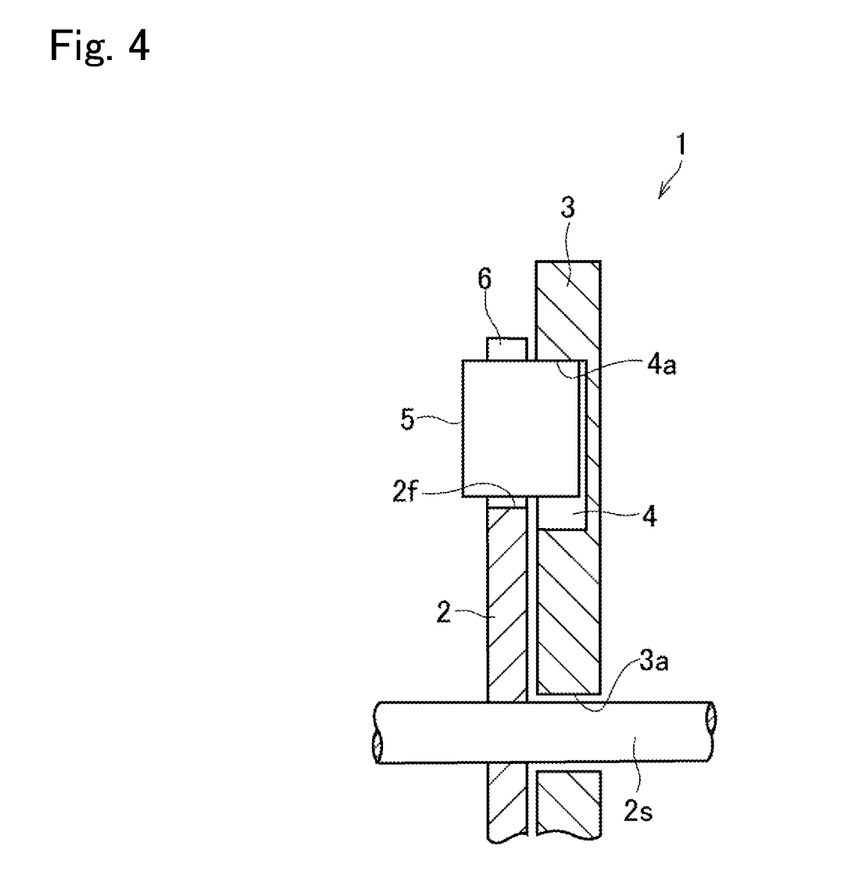
FIG. 4 is a cross-sectional view of a centrifugal pendulum damper according to an example embodiment in which one side of the chamber is closed.
Figure 5:
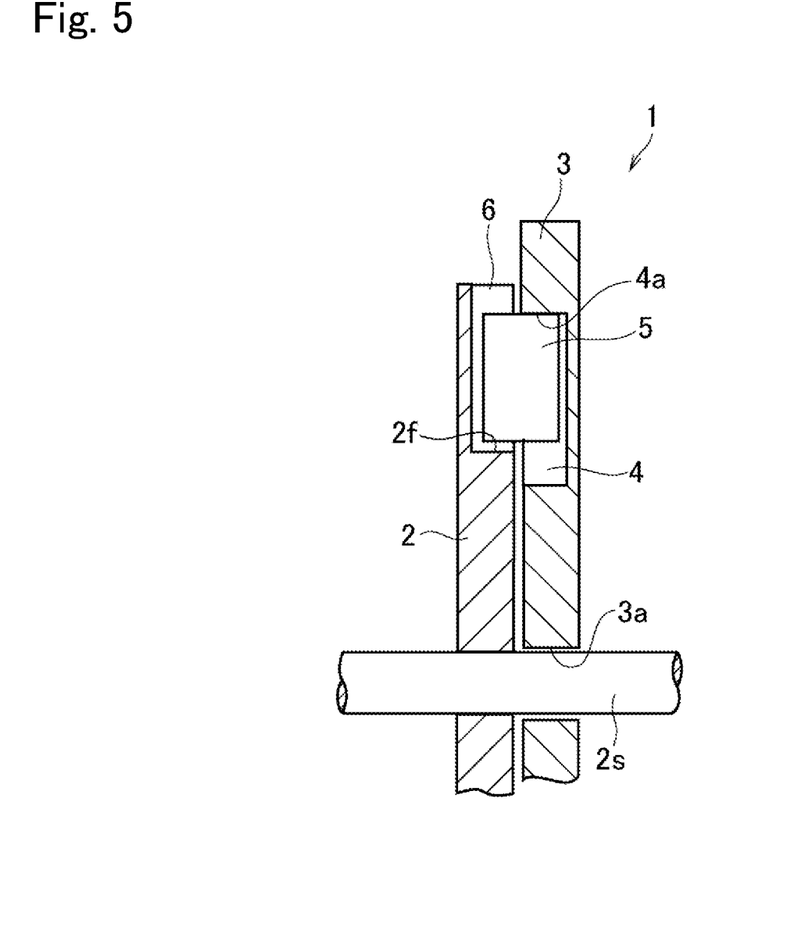
FIG. 5 is a cross-sectional view of a centrifugal pendulum damper according to an example embodiment in which one side of the chamber and a guide groove are closed.

In the example shown in FIG. 3, the chamber 4 is a bore penetrating through the inertial member 3 in the thickness direction. Nonetheless, as illustrated in FIGS. 4 and 5, an axially outer side of the chamber 4 may be closed to form a bottom of the chamber 4.

The rolling member 5 as a pendulum mass is held in each of the four chambers 4. Number of the rolling member 5 may be changed in accordance with number of the chamber 4. Specifically, the rolling member 5 is a column-shaped rigid body.

Shape of the rolling member 5 may also be altered arbitrarily according to need. For example, the rolling member 5 may be shaped to have an H-shaped cross-section, or shaped into spherical-shape.

In the damper 1, torque of the rotary member 2 is transmitted to the inertial member 3 through the rolling member 5. That is, the rolling member 5 is brought into contact to both of the rotary member 2 and the inertial member 3. Specifically, the rolling member 5 is engaged with stoppers 6 of the guide groove 6a formed in the rotary member 2, and with the chamber 4 formed in the inertial member 3. In the example shown in FIG. 3, an axial length of the rolling member 5 is longer than a thickness of the inertial member 3. A portion of the rolling member 5 held in the chamber 4 comes into contact to the chamber 4, and a portion of the rolling member 5 protruding from the chamber 4 comes into contact to the stopper 6 of the guide groove 6a.

Specifically, four pairs of the stoppers 6 protrude radially outwardly from an outer edge 2f of the rotary member 2 to be overlapped individually with the chamber 4, and the portion of the rolling member 5 protruding from the chamber 4 is held between the pair of stoppers 6. Number of the guide groove 6a may also be changed in accordance with number of the rolling member 5 or the chamber 4. A width of the guide groove 6a is substantially identical to or wider than an outer diameter of the rolling member 5.

Figure 6:
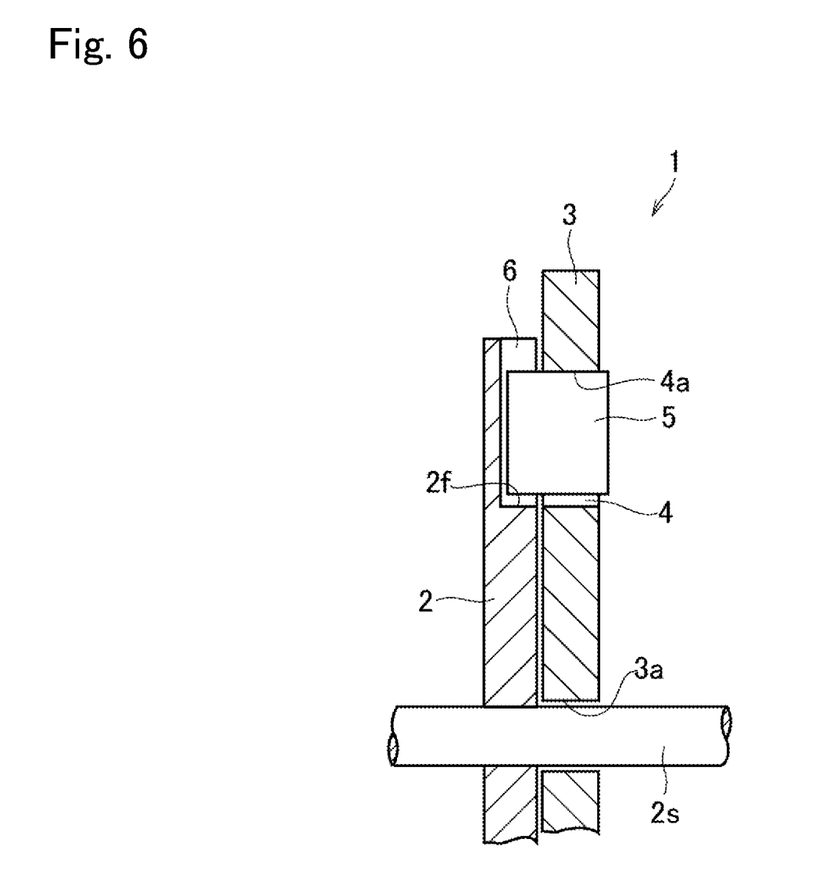
FIG. 6 is a cross-sectional view of a centrifugal pendulum damper according to an example embodiment in which the guide groove is closed.

Optionally, the structure of the chamber 4 or the guide groove 6a may be altered as explained below. FIGS. 4 to 6 are cross-sectional views of a centrifugal pendulum damper 1 according to example embodiments of the present disclosure. The embodiments illustrated in FIGS. 4 and 5 show that an axially outer side of the chamber 4 is closed to form a bottom of the chamber 4. Further, in the embodiments illustrated in FIGS. 5 and 6, an axially outer side of the guide groove 6a is closed. In the example embodiment shown in FIG. 5, both of the axially outer side of the chamber 4 and the axially outer side of the guide groove 6a are closed.

Thus, the rolling member 5 is partially held in the chamber 4 and the portion of the rolling member 5 protruding from the chamber 4 is held between the pair of stoppers 6. In the damper 1, therefore, the rolling member 5 is rotated together with the rotary member 2 while being oscillated along the raceway surface 4a. In this situation, the rolling member 5 allowed to oscillate circumferentially within the pair of stoppers 6, and to move radially between the pair of stoppers 6. Specifically, when the inertial member 3 rotates relatively to the rotary member 2, a contact point P2 at which the torque is transmitted between the rolling member 5 and the stopper 6 is displaced in the radial direction, and the rolling member 5 is brought into contact not only to the stopper 6 but also to the raceway surface 4a. That is, the contact point P2 between the rolling member 5 and the stopper 6 is reciprocated in the radial direction in response to pulsation of the torque applied to the rotary member 2.

In the damper 1, the rotary member 2 is rotated by the torque applied to the shaft 2s from the prime mover 7, and the rolling members 5 are rotated together with the rotary member 2 around the shaft 2s. In this situation, each of the rolling members 5 is individually subjected to a centrifugal force in accordance with a rotational speed of the rotary member 2, and a radius of the rotary member 2. That is, the rolling member 5 is centrifugally moved radially outwardly within the guide groove 6a with an increase in the centrifugal force. Specifically, when the rotational speed of the rotary member 2 is increased to a level at which the centrifugal force overwhelms a gravitational force, the rolling member 5 is pushed onto a radially outermost portion of the raceway surface 4a from the rotational center CL. In this situation, if the rotary member is rotated smoothly or torque pulse is small, the rolling member 5 transmits the torque of the rotary member 2 to the inertial member 3 without oscillating along the raceway surface 4a. Consequently, the rotary member 2, the rolling members 5, and the inertial member 3 are rotated integrally. In other words, the damper 1 is rotated integrally.

The torque pulse applied to the rotary member 2 propagates to the rolling member 5. When an oscillation energy applied to the rolling member 5 resulting from the torque pulse overwhelms a frictional force acting between the rolling member 5 and the raceway surface 4a at the contact point P1, the rotary member 2, the rolling members 5, and the inertial member 3 are rotated relatively to one another. Consequently, the rolling member 5 is oscillated along the raceway surface 4a. As described, the curvature radius of the raceway surface 4a is shorter than the radius of the inertial member 3, therefore, a radial position of the rolling member 5 thus oscillated along the raceway surface 4a changes within the pair of stoppers 6. Consequently, the contact point P2 at which the torque is transmitted between the rolling member 5 and the stopper 6 is displaced in the radial direction. Such circumferential oscillation and radial reciprocation of the rolling member 5 is repeated as long as the torque pulse is applied to the rotary member 2. That is, the torque pulse of the rotary member 2 propagates to the inertial member 3 through the rolling members 5. The torque pulse thus applied to the inertial member 3 is suppressed by an inertia moment resulting from the relative rotation of the inertial member 3 to the rotary member 2.

Thus, in the damper 1, the torque applied to the rotary member 2 from the prime mover 7 is transmitted to the inertial member 3 through the rolling member 5 and the raceway surface 4a. In the damper 1, the principle of the restoring force to return the rolling member 5 to the outermost point of the raceway surface 4a is different from that in the conventional centrifugal pendulum damper in which the rolling member serves as an inertial mass.

In the conventional centrifugal pendulum damper shown in FIG. 1 in which the rolling member serves as an inertial mass, the restoring force $H_1$ can be expressed as:

$$H_1 = F_1 \cdot \sin \theta_1$$

and the restoring force $H_1$ changes linearly with respect to the oscillation angle of the rolling member $\theta_1$.

Figure 7:
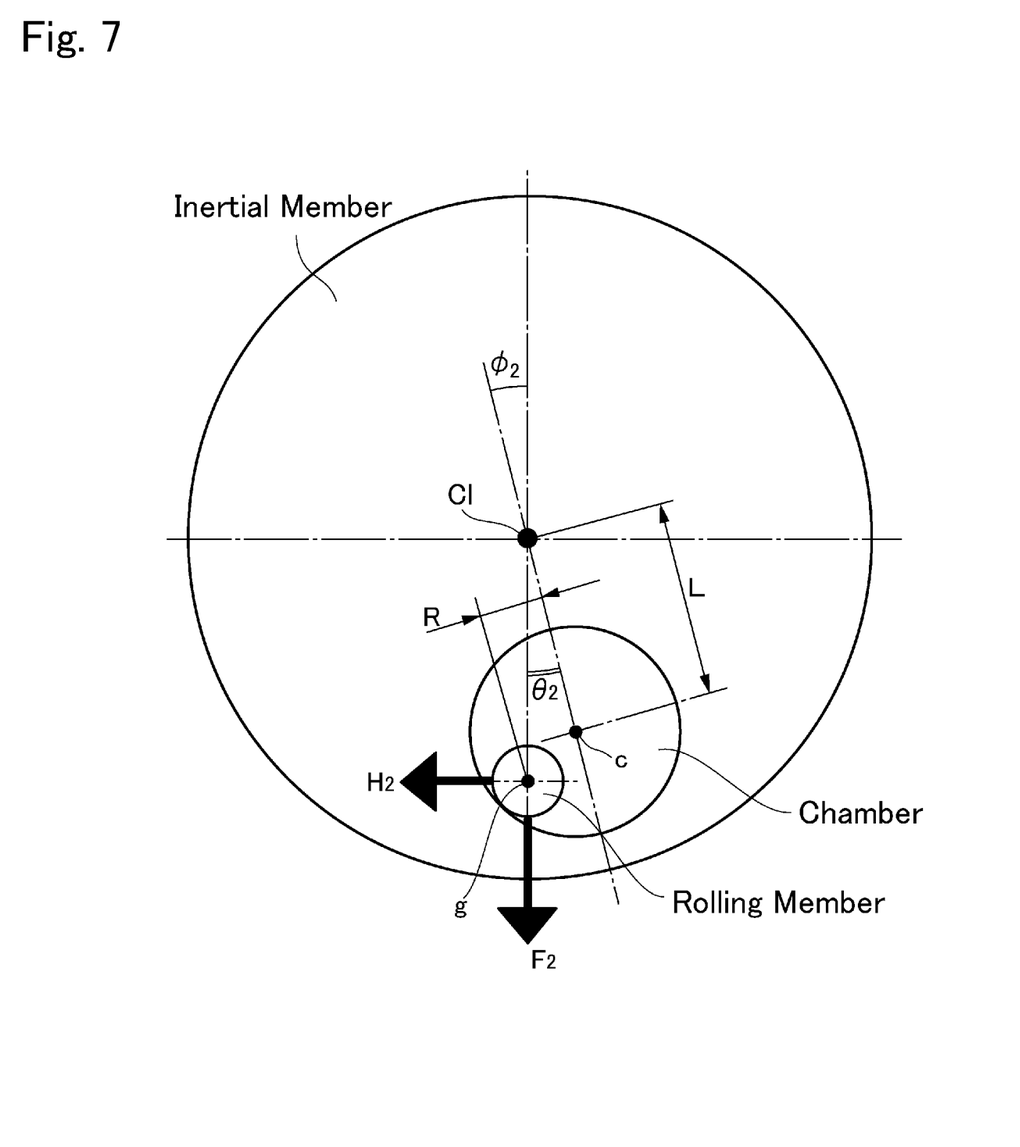
FIG. 7 is a schematic illustration showing a restoring force of a rolling member of a centrifugal pendulum damper in which a torque of a prime mover is applied to the inertial member through the rolling member.

In the centrifugal pendulum damper in which the torque of the prime mover is transmitted to the inertial member through the rolling members as the damper 1 according to the embodiment, given that the centrifugal force acting on the rolling member is $F_2$, an oscillation angle (absolute value) of the rolling member is $\theta_2$, and a rotational angle (absolute value) of the inertial member is $\varphi_2$ as shown in FIG. 7, the restoring force (absolute value) $H_2$ of the rolling member can be expressed as:

$$H_2 = F_2 \cdot \tan(\theta_2 - \theta_2).$$

Although not especially shown in FIG. 7, as described, each of the rolling members is individually held between the pair of stoppers of the guide groove formed integrally with the rotary member. That is, the torque is transmitted between the inertial member and the rotary member through the stoppers. In the damper of this kind, therefore, the restoring force $H_2$ is applied to the stopper in a direction perpendicular to a direction of the centrifugal force $F_2$.

Given that a distance between a rotational center C1 of the inertial member and a center c of the chamber is L, and a distance between the center c of the chamber and a gravity center g of the rolling member is R, a relation between the oscillation angle $\theta_2$ of the rolling member and the rotational angle $\varphi_2$ of the inertial member can be expressed as:

$$L \cdot \sin \varphi_2 = R \cdot \sin(\theta_2 - \varphi_2).$$

Here, it is to be noted that a shape of the chamber is approximated to a true circle in FIG. 7 for the purpose of simplifying the calculations. In the centrifugal pendulum damper in which the torque of the prime mover is transmitted to the inertial member through the rolling members as illustrated in FIG. 7, therefore, the gravity center g of the oscillating rolling member migrates along a circular orbit whose curvature radius is constant.

Based on the relation between the oscillation angle $\theta_2$ and the rotational angle $\varphi_2$ as expressed above, an influence of the rotational angle $\varphi_2$ in the formula for calculating the restoring force $H_2$ is vanishingly small. For this reason, the restoring force $H_2$ may also be calculated approximately using the following formula:

$$H_2 \approx F_2 \cdot \tan \theta_2.$$

In the centrifugal pendulum damper shown in FIG. 7, accordingly, the restoring force $H_2$ changes in a non-linear fashion or logarithmically with respect to the oscillation angle $\theta_2$. If the restoring force $H_2$ changes logarithmically depending on the oscillation angle $\theta_2$, a natural frequency of the vibration system would be increased significantly especially when the oscillation angle $\theta_2$ is significantly large. In this case, the inertia moment for suppressing the torsional vibration of predetermined order may not be established. Consequently, vibration damping performance of the centrifugal pendulum damper would be reduced.

Figure 8:
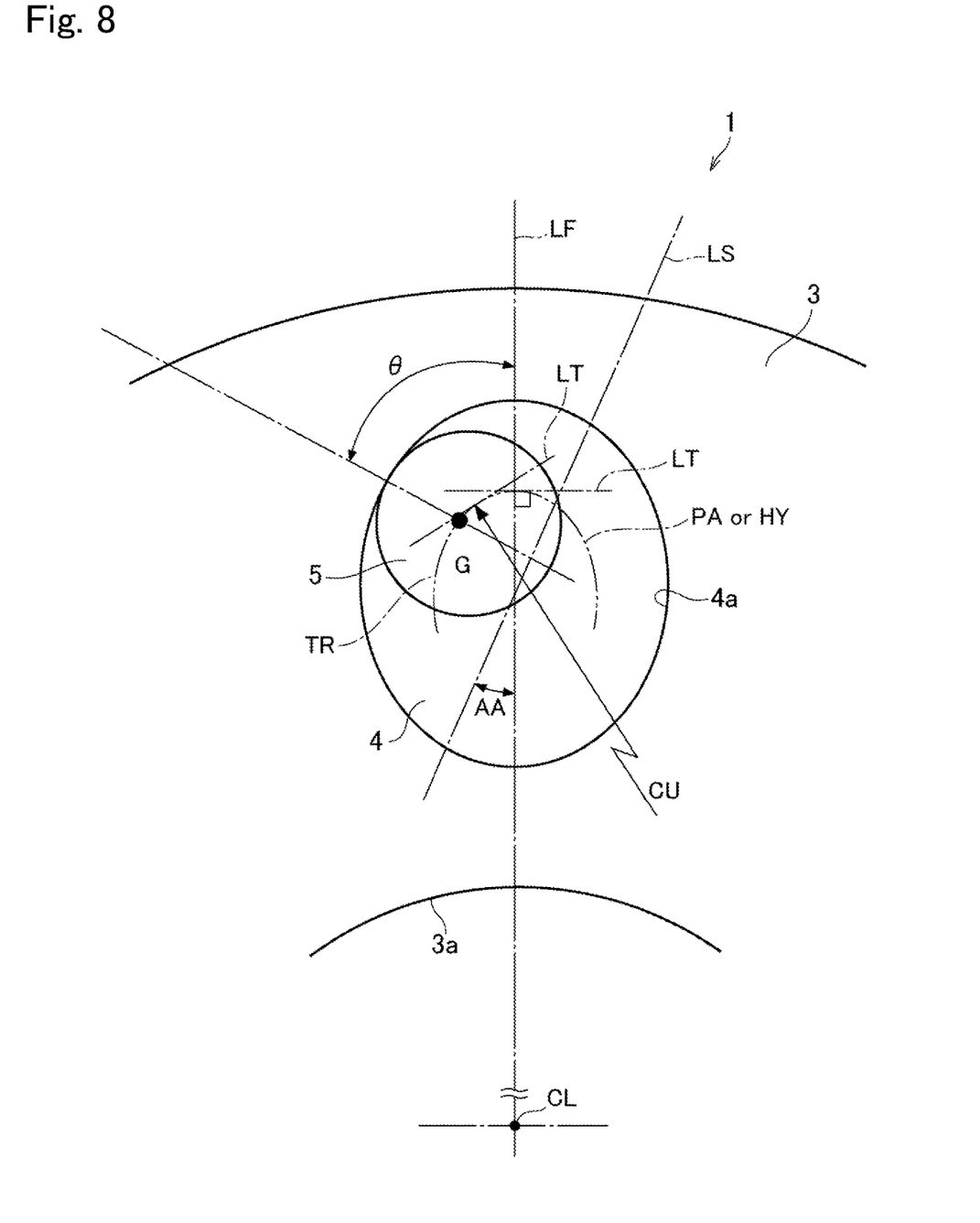
FIG. 8 is an explanatory drawing showing an example of a structure of the raceway surface formed in the chamber.
Figure 9:
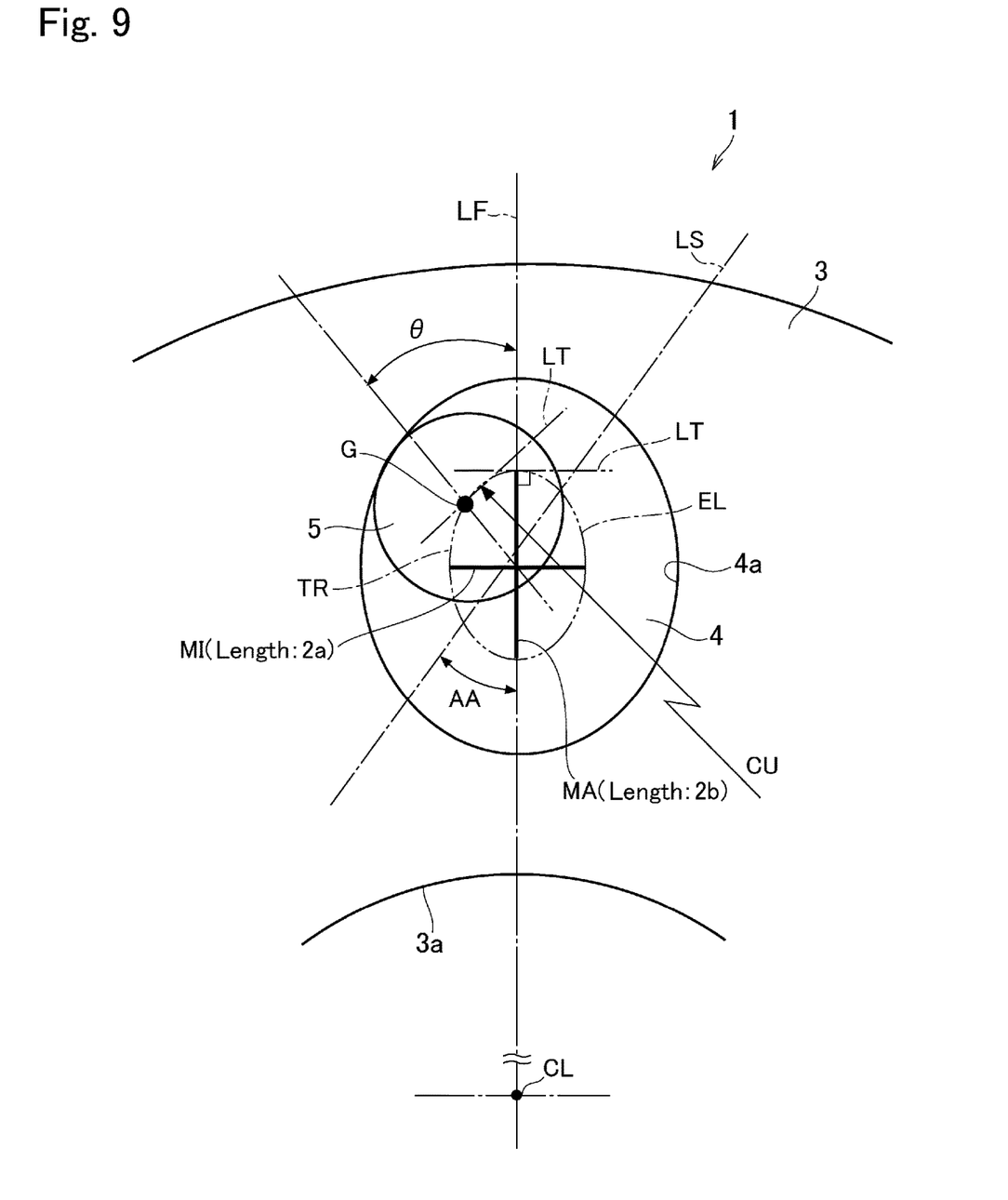
FIG. 9 is an explanatory drawing showing another example of a structure of the raceway surface formed in the chamber.

In order to avoid such reduction in vibration damping performance, in the damper 1 of according to the embodiment, the rolling member 5 is centrifugally pushed onto the raceway surface 4a in the chamber 4, while being oscillated by the torque pulse within an oscillation angle θ with respect to the outermost point in the raceway surface 4a from the rotational center CL of the rotary member 2. According to the embodiment, as shown in FIGS. 8 and 9, the raceway surface 4a of the chamber 4 is formed as a part of a quadratic curve. Specifically, the raceway surface 4a of the chamber 4 is formed such that a curvature radius CU of an orbit TR of the gravity center G of the rolling member 5 is increased with an increase in the oscillation angle θ of the rolling member 5. The curvature radius CU becomes shortest when the gravity center G of the rolling member 5 is situated on a first line LF passing through the rotational center CL in a direction perpendicular to a tangent line LT to a radially outermost point of the orbit TR. In other words, the curvature radius CU becomes longer with an increase in an angle AA between the first line LF and a second line LS intersecting with the first line LF and the orbit TR within the oscillation angle θ, in the direction such that the angle AA is restricted within an acute angle.

More specifically, as shown in FIG. 8, the raceway surface 4a of the chamber 4 is contoured in such a manner that the orbit TR of the gravity center G of the rolling member 5 takes the form of a part of a predetermined parabola PA. The parabola PA may be a parabola drawn by connecting a plurality of parabolas smoothly. Alternatively, the raceway surface 4a may also be contoured in such a manner that the orbit TR of the gravity center G of the rolling member 5 takes the form of a part of a predetermined hyperbolic curve HY. In this case, the hyperbolic curve HY may be a hyperbolic curve drawn by connecting a plurality of hyperbolic curves smoothly. That is, the raceway surface 4a is contoured as a part of a parabola or a hyperbolic curve similar to the parabola PA or the hyperbolic curve HY, or a as a part of a curve drawn by combining the parabola PA and the hyperbolic curve HY. As described, each of the rolling members 5 is individually shaped into a column or cylindrical shape to roll on the raceway surface 4a. That is, the gravity center G is situated at a rotational center of the rolling member 5 in the radial direction.

Instead, the raceway surface 4a may also be contoured in such a manner that the orbit TR of the gravity center G of the rolling member 5 takes the form of a part of an ellipse EL whose major axis MA extends in the radial direction of the inertial member 3. As described, each of the rolling members 5 is individually shaped into a column or cylindrical shape to roll on the raceway surface 4a. In this case, therefore, the gravity center G of the rolling member 5 is situated at a rotational center of the rolling member 5 in the radial direction. Accordingly, in the example shown in FIG. 9, the raceway surface 4a is contoured as a part of an ellipse similar to the ellipse EL.

A minor axis MI of the ellipse EL extends in a tangential direction perpendicular to the major axis MA. Accordingly, given that a length of the major axis MA is 2b, a length of the minor axis MI is 2a, a direction of the major axis MA is an ordinate y, and a direction of the minor axis MI is an abscissa x, the ellipse EL can be expressed as:

$$X^2/a^2 + y^2/b^2 = 1 \ (0 < a < b).$$

Thus, in the example shown in FIG. 9, the raceway surface 4a is contoured as a part of the ellipse in which the major axis MA extends in the radial direction of the inertial member 3, and the minor axis MI shorter than the major axis MA extends in the circumferential direction of the inertial member 3.

For example, the length 2b of the major axis MA and the length 2a of the minor axis MI are set in such a manner that an aspect ratio α between the length 2b of the major axis MA and the length 2a of the minor axis MI satisfies the following inequality:

$$0.6 < a < 0.8 \ (\alpha = a/b).$$

In the example shown in FIG. 9, a natural frequency of the vibration system may be changed by changing a shape of the ellipse EL. For example, the natural frequency of the vibration system may be adjusted by changing the aspect ratio α.

Figure 10:
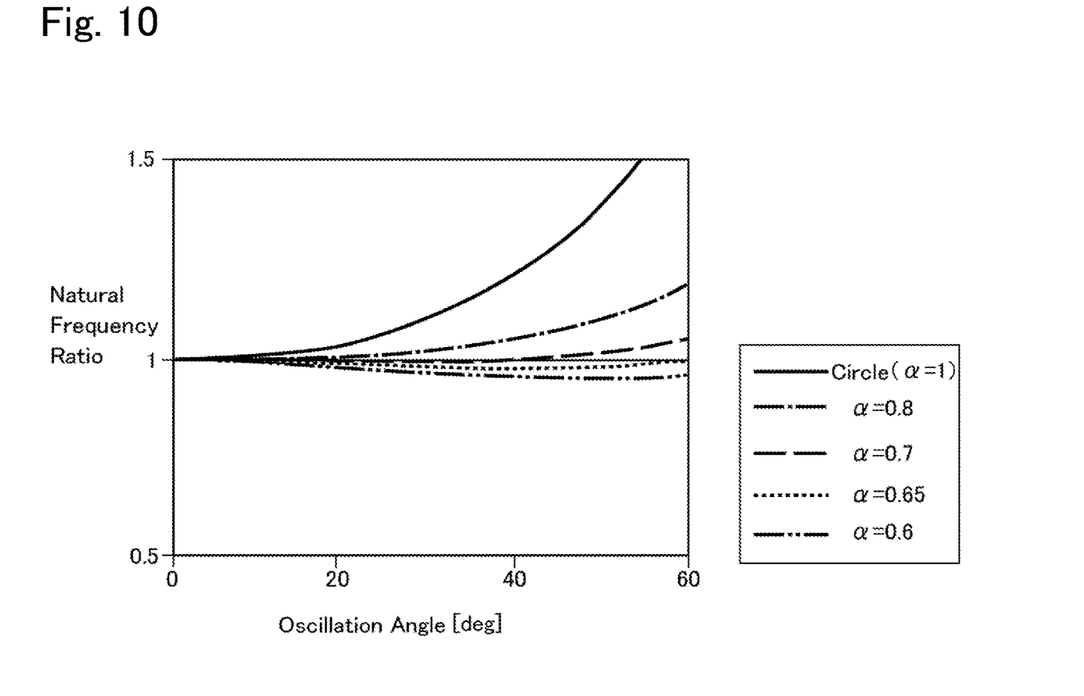
FIG. 10 is a graph indicating a relation between an oscillation angle of the rolling member and a natural frequency ratio of a case in which the oscillation angle of the rolling member is set within a range from 0 to 60 degrees.
Figure 11:
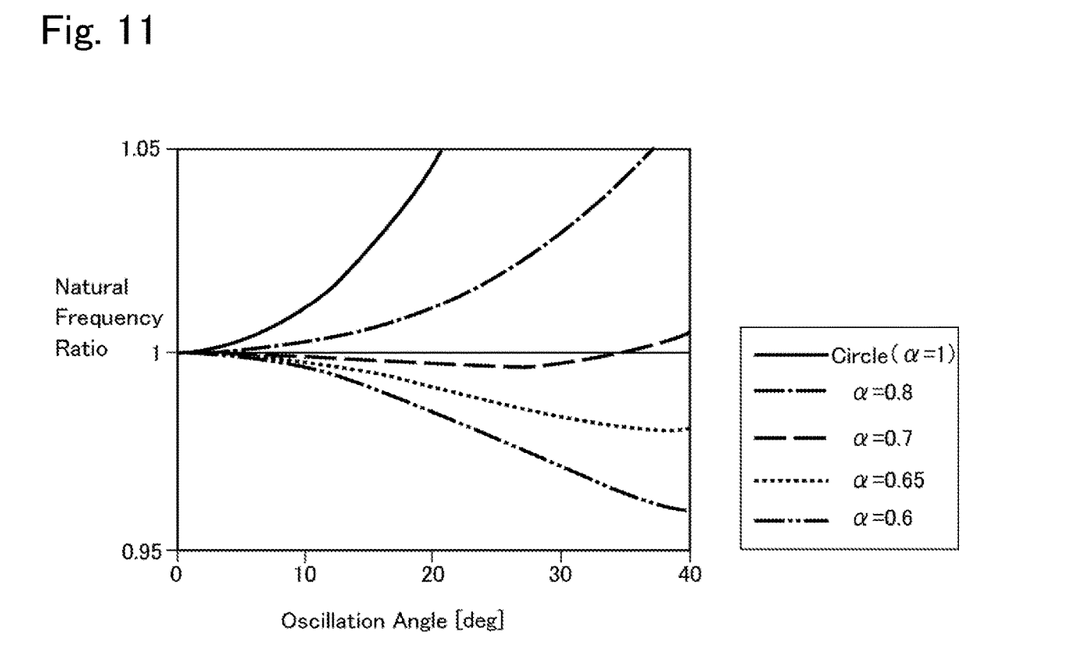
FIG. 11 is a graph indicating a relation between an oscillation angle of the rolling member and the natural frequency ratio of a case in which the oscillation angle of the rolling member is set within a range from 0 to 40 degrees.

A relation among the oscillation angle θ of the rolling member 5, the aspect ratio α of the ellipse EL, and a natural frequency ratio is shown in FIGS. 10 and 11. The natural frequency ratio is a ratio of the natural frequency to the oscillation angle θ given that the natural frequency is "1" when the oscillation angle θ is "0". Specifically, FIG. 10 indicates a relation between the oscillation angle θ and the natural frequency ratio of a case in which the oscillation angle θ of the rolling member 5 is set within a range from 0 to 60 degrees, and FIG. 11 indicates a relation between the oscillation angle θ and the natural frequency ratio of a case in which the oscillation angle θ of the rolling member 5 is set within a range from 0 to 40 degrees. Such relation may be obtained by measuring the natural frequency of the vibration system during experimentation, or based on a result of computer simulation.

In the example shown in FIG. 9, the raceway surface 4a is contoured in such a manner that the orbit TR of the gravity center G of the rolling member 5 takes the form of a part of the ellipse EL, therefore, the curvature radius CU of the orbit TR increases with an increase in the oscillation angle θ of the rolling member 5. For this reason, the restoring force of the rolling member is changed substantially linearly with respect to a change in the oscillation angle θ of the rolling member 5 thereby suppressing a change in the natural frequency of the vibration system. By thus keeping the natural frequency constant as much as possible even if the oscillation angle θ is changed, the vibration suppressing performance of the damper 1 can be maintained. That is, it is preferable to maintain the natural frequency ratio shown in FIGS. 10 and 11 as close as possible to "1". Consequently, the natural frequency of the vibration system can be maintained substantially constant even if the oscillation angle θ is increased.

To this end, in the case of setting the oscillation angle θ of the rolling member 5 within a range from 0 to 60 degrees as shown in FIG. 10, it is preferable to contour the raceway surface 4a in such a manner as to keep the aspect ratio α of the ellipse EL to 0.65. On the other hand, in the case of setting the oscillation angle θ of the rolling member 5 within a range from 0 to 40 degrees as shown in FIG. 11, it is preferable to contour the raceway surface 4a in such a manner as to keep the aspect ratio α of the ellipse EL to 0.7. Based on the above-explained facts, in order to maintain the vibration suppressing performance of the damper 1, it is preferable to contour the raceway surface 4a in such a manner that the aspect ratio α is kept within a range from 0.6 to 0.8.

Thus, in the damper 1 according to the embodiment, the raceway surface 4a is contoured in such a manner that the curvature radius CU of the orbit TR of the gravity center G of the rolling member 5 is increased with an increase in the oscillation angle θ of the rolling member 5. Specifically, the raceway surface 4a is contoured in such a manner that the orbit TR takes the form of a part of the parabola PA, the hyperbolic curve HY, or the ellipse EL. In other words, the raceway surface 4a is contoured in such a manner that the orbit TR takes the form of a part of a quadratic curve. According to the embodiment, therefore, the restoring force $H_2$ will not be changed in a non-linear fashion or logarithmically as shown in FIG. 7. Specifically, when the oscillation angle θ is increased by the torque pulse, the restoring force to suppress the torque pulse is increased linearly with an increase in the torque pulse. For this reason, the vibration suppressing performance of the damper 1 can be maintained in accordance with a magnitude of the torque pulse. Consequently, the natural frequency of the vibration system can be maintained constant irrespective of the oscillation angle θ of the rolling member 5. As a result, the damper 1 is allowed to stably suppress the torsional vibrations of predetermined order.

What is claimed is:
1. A centrifugal pendulum damper comprising:
   a rotary member to which a torque of a predetermined prime mover is applied;
   an inertial member that is allowed to rotate relatively to the rotary member;
   a chamber that is formed on the inertial member; and
   a rolling member that is held partially in the chamber while being allowed to roll along a raceway surface formed on an inner circumferential face of the chamber, and that is held partially by the rotary member while being allowed to move in a radial direction of the rotary member, wherein the torque applied to the rotary member is transmitted to the inertial member through the rolling member to suppress torsional vibrations of the rotary member, the raceway surface is formed such that a center of curvature of the raceway surface is situated radially outside of a rotational center of the inertial member and such that a curvature radius of an orbit of the gravity center of the rolling member is increased with an increase in an oscillation angle of the rolling member, and the raceway surface is contoured such that the curvature radius of the orbit of the gravity center of the rolling member oscillating along the raceway surface becomes the shortest at a position where a first straight line passing through the rotational center of the inertial member in a direction perpendicular to a tangent line of the orbit of the gravity center of the rolling member.

2. The torsional vibration damper as claimed in claim 1, wherein the raceway surface is contoured such that the orbit takes the form of a part of an ellipse whose major axis extends in the radial direction of the inertial member.

3. The centrifugal pendulum damper as claimed in claim 2, wherein the ellipse is expressed as $$X^2/a^2+y^2/b^2=1 \ (0<a<b)$$

given that a length of the major axis of the ellipse is 2b and a length of a minor axis of the ellipse is 2a, and the length of the major axis and the length of the minor axis are set such that a ratio a/b between the length of the major axis and the length of the minor axis satisfies the following inequality: $0.6<a<0.8$.

4. The centrifugal pendulum damper as claimed in claim 3, further comprising a guide groove that is formed on the rotary member to restrict a movement of the rolling member in a rotational direction of the rotary member while allowing the rolling member to move in the radial direction of the rotary member, wherein a contact point between the rolling member and the guide groove moves in the radial direction of the rotary member, and the rolling member is brought into contact to the guide groove and the raceway surface, when the rotary member and the inertial member rotate relatively to each other.

5. The centrifugal pendulum damper as claimed in claim 1, wherein the raceway surface is contoured such that the orbit takes the form of a part of a predetermined parabola or hyperbolic curve.

6. The centrifugal pendulum damper as claimed in claim 5, further comprising a guide groove that is formed on the rotary member to restrict a movement of the rolling member in a rotational direction of the rotary member while allowing the rolling member to move in the radial direction of the rotary member, wherein a contact point between the rolling member and the guide groove moves in the radial direction of the rotary member, and the rolling member is brought into contact to the guide groove and the raceway surface, when the rotary member and the inertial member rotate relatively to each other.

7. The centrifugal pendulum damper as claimed in claim 1, further comprising a guide groove that is formed on the rotary member to restrict a movement of the rolling member in a rotational direction of the rotary member while allowing the rolling member to move in the radial direction of the rotary member, wherein a contact point between the rolling member and the guide groove moves in the radial direction of the rotary member, and the rolling member is brought into contact to the guide groove and the raceway surface, when the rotary member and the inertial member rotate relatively to each other.

8. The centrifugal pendulum damper as claimed in claim 2, further comprising a guide groove that is formed on the rotary member to restrict a movement of the rolling member in a rotational direction of the rotary member while allowing the rolling member to move in the radial direction of the rotary member, wherein a contact point between the rolling member and the guide groove moves in the radial direction of the rotary member, and the rolling member is brought into contact to the guide groove and the raceway surface, when the rotary member and the inertial member rotate relatively to each other.

9. The torsional vibration damper as claimed in claim 1, wherein the inertial member is an annular plate member arranged coaxially with the rotary member.

10. The torsional vibration damper as claimed in claim 1, wherein a through hole is formed in a center of the inertial member and a shaft of the rotary member is inserted loosely into the through hole.

11. The torsional vibration damper as claimed in claim 1, wherein a predetermined clearance is maintained between the through hole and the shaft.

* * * * *